(12) United States Patent
Ueda et al.

(10) Patent No.: US 8,638,058 B2
(45) Date of Patent: Jan. 28, 2014

(54) POSITIONING CONTROL DEVICE

(75) Inventors: Koichiro Ueda, Tokyo (JP); Kimiyuki Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 13/499,085

(22) PCT Filed: Aug. 19, 2010

(86) PCT No.: PCT/JP2010/005112
§ 371 (c)(1),
(2), (4) Date: Mar. 29, 2012

(87) PCT Pub. No.: WO2011/039929
PCT Pub. Date: Apr. 7, 2011

(65) Prior Publication Data
US 2012/0187891 A1    Jul. 26, 2012

(30) Foreign Application Priority Data

Sep. 30, 2009 (JP) .................................. 2009-227188

(51) Int. Cl.
*G05B 5/01* (2006.01)
*H02P 7/00* (2006.01)
*G05D 23/275* (2006.01)

(52) U.S. Cl.
USPC ........................... 318/615; 318/432; 318/632

(58) Field of Classification Search
USPC .......................... 318/615, 432, 611, 632, 609
See application file for complete search history.

(56) References Cited

U.S. PATENT DOCUMENTS

| | | | |
|---|---|---|---|
| 6,936,990 B2 * | 8/2005 | Oyama et al. | 318/632 |
| 7,671,553 B2 * | 3/2010 | Terada et al. | 318/432 |
| 8,193,748 B2 * | 6/2012 | Deller et al. | 318/400.04 |

FOREIGN PATENT DOCUMENTS

| | | | |
|---|---|---|---|
| JP | 61-173305 A | 8/1986 |
| JP | 63-273902 A | 11/1988 |
| JP | 2-311911 A | 12/1990 |
| JP | 2005-25316 A | 1/2005 |
| JP | 2006-197726 A | 7/2006 |
| JP | 2009-122778 A | 6/2009 |

OTHER PUBLICATIONS

Neil Cooper Singer; Residual Vibration Reduction in Computer Controlled Machines; Feb. 10, 1989; Neil Cooper Singer, 1988; p. 24-p. 31 & p. 209.*
International Search Report (PCT/ISA/210) issued by the International Searching Authority in corresponding International Application No. PCT/JP2010/005112 on Oct. 19, 2010.

* cited by examiner

*Primary Examiner* — Dameon Levi
*Assistant Examiner* — Zemenay Truneh
(74) *Attorney, Agent, or Firm* — Sughrue Mion, PLLC

(57) ABSTRACT

In positioning control of a machine in which residual vibrations are caused due to a low mechanical rigidity, residual vibrations are suppressed within an allowable positioning error, and a positioning time period required for the positioning control is shortened.

Based on information of operation conditions and residual vibrations, the amplitude of the residual vibrations of the machine is predicted before execution of positioning, and based on a result of the prediction, a first servo controller (11) which performs positioning control in which suppression of residual vibrations of the machine is not considered or a second servo controller (12) in which suppression of residual vibrations of the machine is considered is automatically selectively used.

7 Claims, 12 Drawing Sheets

POSITIONING CONTROL DEVICE

TECHNICAL FIELD

The present invention relates to a positioning control device for a machine, and more particularly to a positioning control device for driving a low-rigidity machine.

BACKGROUND ART

In an industrial machine, positioning control is requested to be performed within a positioning error in which a mechanical load is acceptable, while reducing the influence of residual vibrations caused due to a low mechanical rigidity, thereby shortening a time period required for the control. As a known art for solving such a problem, Patent Reference 1 discloses a positioning control device in which vibrations during positioning control are reduced by shaping a position command signal by using a pre-filter corresponding to the vibration characteristics due to the position command signal, thereby suppressing excitation of residual vibrations. Patent Reference 2 discloses a positioning control device in which vibrations during positioning control are reduced by, during positioning control, varying the transfer characteristics of a position control loop depending on a remaining movement distance, thereby suppressing excitation of residual vibrations.

PRIOR ART REFERENCE

Patent References

Patent Reference 1: JP-A-2005-25316
Patent Reference 2: JP-A-S63-273902

SUMMARY OF THE INVENTION

Problems that the Invention is to Solve

In the technique disclosed in above-described Patent Reference 1, in the case where positioning control is performed with respect to a plurality of movement distances, an original position command signal is shaped by using a pre-filter which is independent of a movement distance, and hence the position command signal after shaping delays with respect to the original position command signal. In the case where an operation is performed in a short movement distance, particularly, the command expending time period from start of the original position command signal to reaching the target position is short, and hence the command expending time period in the case where a pre-filter is used is relatively longer than that in the case where a pre-filter is not used, with the result that there is a problem in that also the positioning time period is prolonged.

In the technique disclosed in above-described Patent Reference 2, moreover, a specific guideline for a value of the remaining movement distance at which the control loop characteristics is switched is not described, and is must be determined by trial and error, thereby causing a problem in that the adjustment of the positioning control device requires a long time period. In accordance with the switching of the position control loop characteristics during positioning control, moreover, the operation amount of an actuator such as the motor torque is discontinuous, and there is a problem in that vibrations or the like due to this are generated.

The invention has been conducted in order to solve such problems. It is an object of the invention to obtain a positioning control device in which, even with respect to a low-rigidity machine, a time period required for positioning control can be shortened while suppressing vibrations within a desired positioning error, and an adjusting time period of the positioning control device itself can be shortened.

Means for Solving the Problem

A positioning control device of the present invention is characterized in including: a first servo controller which, based on operation condition information configured of a limited acceleration of the machine and a movement distance of a machine in positioning control, produces a position command signal so that a final value is the movement distance and a command acceleration signal that is a second order differential signal is equal to or smaller than the limited acceleration, and which, based on a detection position signal that is detected position information of the machine and the position command signal, produces a first torque command signal for executing the positioning control so that the position command signal and a machine position coincide with each other; second servo controller which, based on the operation condition information configured of the limited acceleration of the machine and the movement distance of the machine in positioning control, produces a position command signal so that a final value is the movement distance and the command acceleration signal that is a second order differential signal is equal to or smaller than the limited acceleration, which, based on the operation condition information, produces a vibration component removed position command signal in which components of residual vibrations that are generated in the positioning control of the machine are removed away from the position command signal, and which, based on the detection position signal and the vibration component removed position command signal, produces a second torque command signal for executing the positioning control so that the vibration component removed position command signal and the machine position coincide with each other; a residual vibration information inputting unit which stores residual vibration information that is obtained by measuring residual vibrations of the machine that are generated when the positioning control is previously performed by using the first servo controller under arbitrary operation conditions; a residual vibration amplitude predicting unit which, based on the residual vibration information and the operation condition information, predicts an amplitude of residual vibrations of the machine that are generated when the positioning control is executed by using the first servo controller; an allowable positioning error inputting unit which stores an allowable value of a difference between the movement distance of the machine that is a target of the positioning control and a detected position of the machine at a timing when the positioning control is ended as an allowable positioning error; a servo controller selecting unit which selects a servo controller to be used in the positioning control for each operation conditions so that, in a case where the residual vibration amplitude predictive value predicted by the residual vibration amplitude predicting unit exceeds the allowable positioning error, the positioning control on the machine is executed by using the second servo controller, and, in a case where the residual vibration amplitude predictive value is equal to or smaller than the allowable positioning error, the positioning control on the machine is executed by using the first servo controller; and a current controller which controls a current to be supplied to a motor that drives the machine based on the torque command signal output from the servo controller that is selected by the servo controlling selecting unit.

Effects of the Invention

According to the positioning control device of the invention, even with respect to a low-rigidity machine, a time period required for positioning control can be shortened while suppressing vibrations within a desired positioning error, and an adjusting time period of the positioning control device itself can be shortened.

Figure 1:
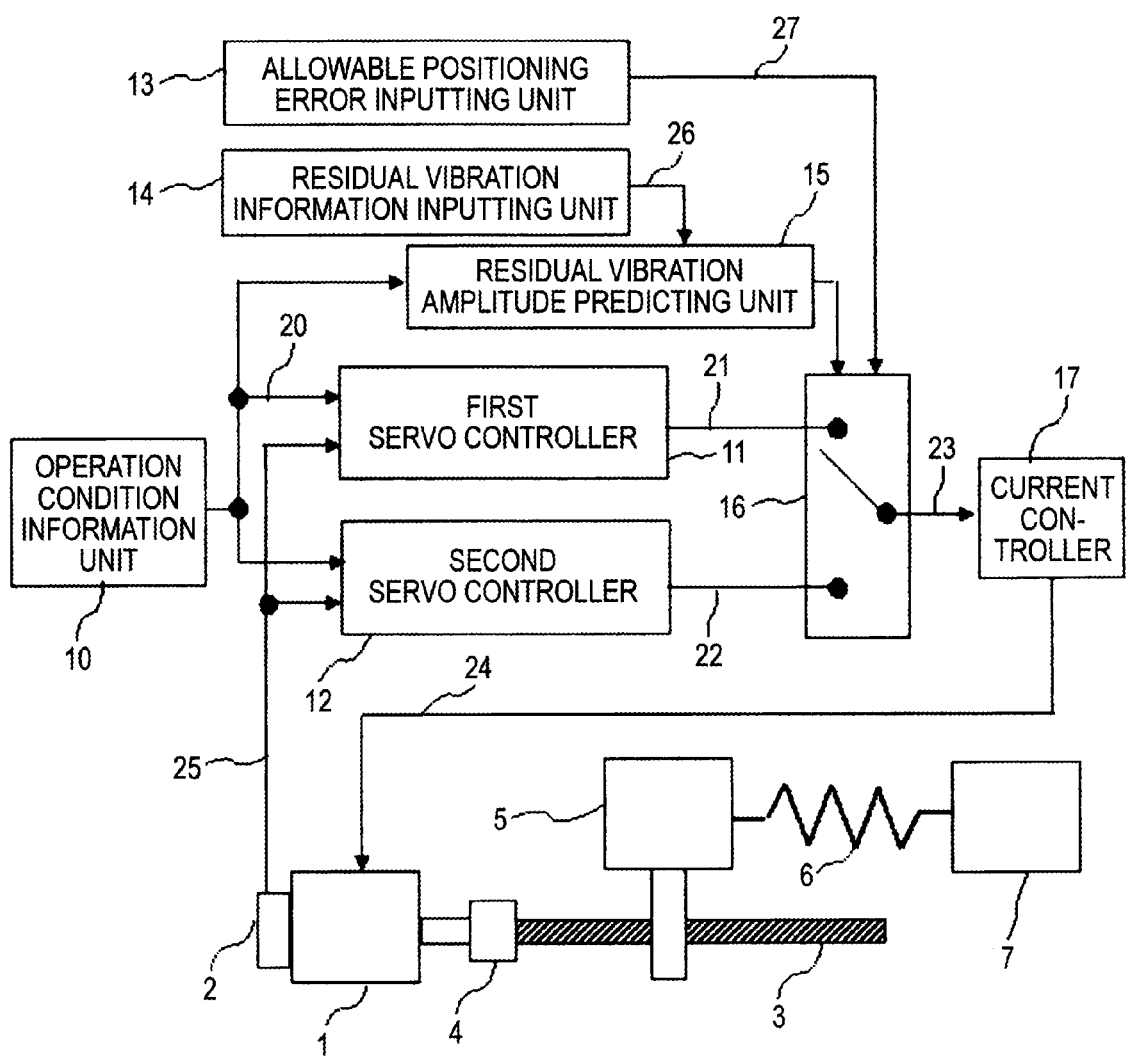
FIG. 1 is a block diagram of a positioning control device of Embodiment 1 of the invention.

DESCRIPTION OF REFERENCE NUMERALS AND SIGNS 1 rotary motor, 2 position detector, 3 ball screw, 4 coupling, 5 ball screw nut, 6 elastic element, 7 load machine,
10 operation condition information unit, 11 first servo controller, 12 a second servo controller,
13 allowable positioning error inputting unit, 14 residual vibration information inputting unit,
15 residual vibration amplitude predicting unit, 16 servo control selecting unit, 17 current controller, 20 operation condition information, 21 first torque command signal, 22 second torque command signal,
23 selection torque command signal, 24 current, 25 detection position information, 26 residual vibration information,
27 allowable positioning error, 30 position command signal producing unit, 31 position controller, 32, 36 differentiator, 33 velocity controller, 35 low-pass filter unit,
37, 57 feedforward torque command signal producing unit,
40 position command signal,
41, 51 position deviation signal, 42, 52 velocity command signal, 43, 53 detection velocity signal,
44, 54 velocity deviation signal, 50 low-pass position command signal,
55 provisional first torque command, 70 vibration component removing unit,
71 vibration component removed position command signal, 80 non-vibration position command signal producing unit,
91 residual vibration amplitude theoretical value calculating unit, 92 proportional constant multiplying unit,
93 servo control selection determining unit, 94 servo control selection executing unit,
101 to 105 adder/subtractor, X residual vibration amplitude predictive value, Y residual vibration amplitude theoretical value.

MODE FOR CARRYING OUT THE INVENTION

Embodiment 1

Embodiment 1 of the invention will be described. FIG. 1 is a block diagram showing an example of a positioning control device. The reference numeral 1 denotes a motor, 2 denotes a position detector which detects position information of the motor 1, 3 denotes a ball screw which converts rotational motion of the motor 1 into linear motion, 4 denotes a coupling which transmits the power of the motor 1 to the ball screw 3, 5 denotes a ball screw nut which is driven by the ball screw 3, 6 denotes an elastic element which is included in a machine, and 7 denotes a load machine which is to be driven.

The reference numeral 10 denotes an operation condition information unit which outputs operation condition information that is information required for positioning control, such as the movement distance and the limited acceleration to be limited in positioning control, 11 denotes a first servo controller which, based on the operation condition information and the position information output from the position detector, calculates a first torque command signal for causing positioning control of the motor to be performed without considering generation of residual vibrations of the machine, and 12 denotes a second servo controller which, based on the operation condition information and the position information output from the position detector, calculates a second torque command signal for causing the positioning control of the motor to be performed while suppressing generation of residual vibrations of the machine.

The reference numeral 13 denotes an allowable positioning error inputting unit through which an allowable value of an error between a target movement distance of the machine and the detected position of the machine at the timing when the positioning control is ended, or an allowable value of the residual vibration amplitude of the machine is input as an allowable positioning error from the outside of the positioning control device, 14 denotes a residual vibration information inputting unit through which information of residual vibrations of the machine (the frequency, amplitude, and the like of the residual vibrations) which are generated when the first servo controller 11 is used is input from the outside of the positioning control device, 15 denotes a residual vibration amplitude predicting unit which, based on the operation condition information, outputs an amplitude predictive value of the residual vibrations of the machine when the positioning control is performed by using the first servo controller, 16 denotes a servo control selecting unit which compares an output of the residual vibration amplitude predicting unit with the allowable positioning error, and which selects whether an actual positioning control is to be performed by using the first torque command produced by the first servo controller, or an actual positioning control operation is to be performed by using the second torque command produced by the second servo controller; and 17 denotes a current controller which, based on the torque command output from the servo controller that is selected by the servo control selecting unit 16, controls a current to be supplied the motor so that the motor 1 can generate a desired torque.

The reference numeral 20 denotes operation condition information which is output from the operation condition information unit 10, 21 denotes a first torque command signal which is produced by the first servo controller, 22 denotes a second torque command signal which is produced by the second servo controller, 23 denotes a selected selection torque command signal which is the torque command output from the servo controller that is selected by the servo control selecting unit 16, 24 denotes a current which is supplied from current controller 17 to the motor 1, and 25 denotes a detection position signal which is position information of the motor 1 that is detected by the position detector 2. The reference numeral 26 denotes residual vibration information which is output from the residual vibration information inputting unit 14, such as the frequency, amplitude, and the like of the residual vibrations. The reference numeral 27 denotes an allowable positioning error which is output from the allowable positioning error inputting unit 13.

The operation of the positioning control device shown in FIG. 1 will be described.

The operation condition information 20 (the movement distance and the limited acceleration to be limited in the positioning control) output from the operation condition information 10 is output to the first servo controller 11, the second servo controller 12, and the residual vibration amplitude predicting unit 15. Moreover, the detection position signal 25 is output from the position detector 2 to the first servo controller 11 and the second servo controller 12. The first servo controller 11 receives the operation condition information 20 and the detection position signal 25, and, based on them, calculates the first torque command signal 21 for causing the positioning control of the motor to be performed without considering generation of residual vibrations of the machine. The second servo controller 12 receives the operation condition information 20 and the detection position signal 25, and, based on them, calculates the second torque command signal 22 for causing the positioning control of the motor to be performed while suppressing generation of residual vibrations of the machine.

The residual vibration amplitude predicting unit 15 receives the operation condition information 20, and information of residual vibrations which is supplied from the outside of the positioning control device through the residual vibration information inputting unit 14, and, based on them, calculates an amplitude predictive value of residual vibrations when the positioning control is performed by using the first servo controller 11. The control selecting unit 16 receives the amplitude predictive value of residual vibrations from the residual vibration amplitude predicting unit 15, and the allowable positioning error from the allowable positioning error inputting unit 13, and, based on them, selects whether the actual positioning control is to be performed by using the first torque command 21, or an actual positioning control operation is to be performed by using the second torque command 22. The current controller 17 supplies the current 24 at which the motor 1 can generate a desired torque, to the motor 1 based on the selection torque command 23 selected by the servo control selecting unit 16, thereby driving the motor 1.

Next, the first servo controller 11 will be described in detail.

Figure 2:
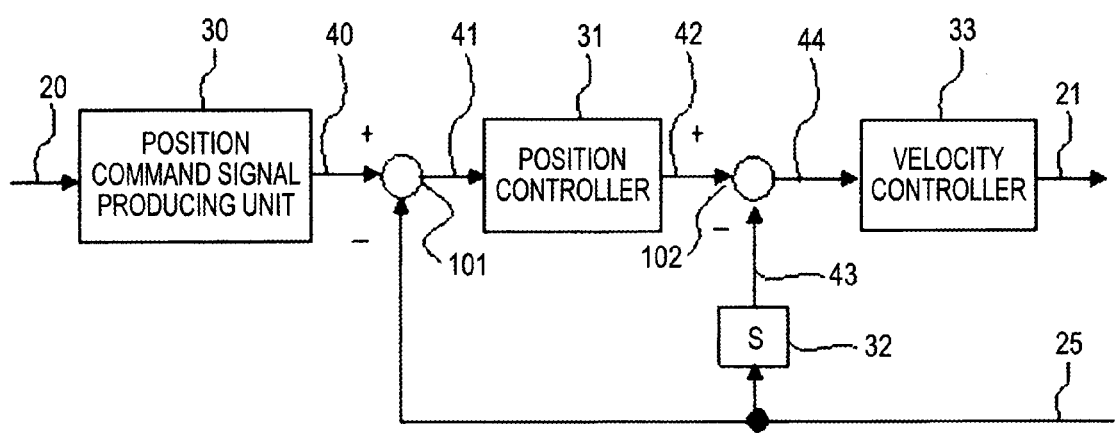
FIG. 2 is a block diagram showing an example of a first servo controller in Embodiment 1 of the invention.

FIG. 2 is a block diagram showing an example of the configuration of the first servo controller. Here, 30 denotes a position command signal producing unit which produces a position command signal 40 based on information of the movement distance and the limited acceleration that is the operation condition information 20, 101 denotes an adder/subtractor which calculates the difference between the position command signal 40 and the detection position signal 25 that is detected from the position detector 2, and which outputs the difference as a position deviation signal 41, 31 denotes a position controller which calculates a velocity command signal 42 from the position deviation signal 41, 32 denotes a differentiator which, from the detection position signal 25, calculates a detection velocity signal 43 that is a differential signal of the detection position signal, 102 denotes an adder/subtractor which calculates the difference between the velocity command signal 42 and the detection velocity signal 43, and which outputs the difference as a velocity deviation signal 44, and 33 denotes a velocity controller which calculates the first torque command 21 from the velocity deviation signal 44.

The operation will be described. In the position command signal producing unit 30, the position command signal 40 is produced from the operation condition information 20, and the velocity command signal 42 is calculated by the position controller 31 by using the position deviation signal 41 which is obtained by subtracting the detection position signal 25 from the position command signal 40. From the velocity command signal 42, the first torque command 21 is calculated by the velocity controller 33 by using the velocity deviation signal 44 which is obtained by subtraction of the detection velocity signal 43 that is obtained by differentiating the detection position signal 25, and the command is output.

Figure 3:
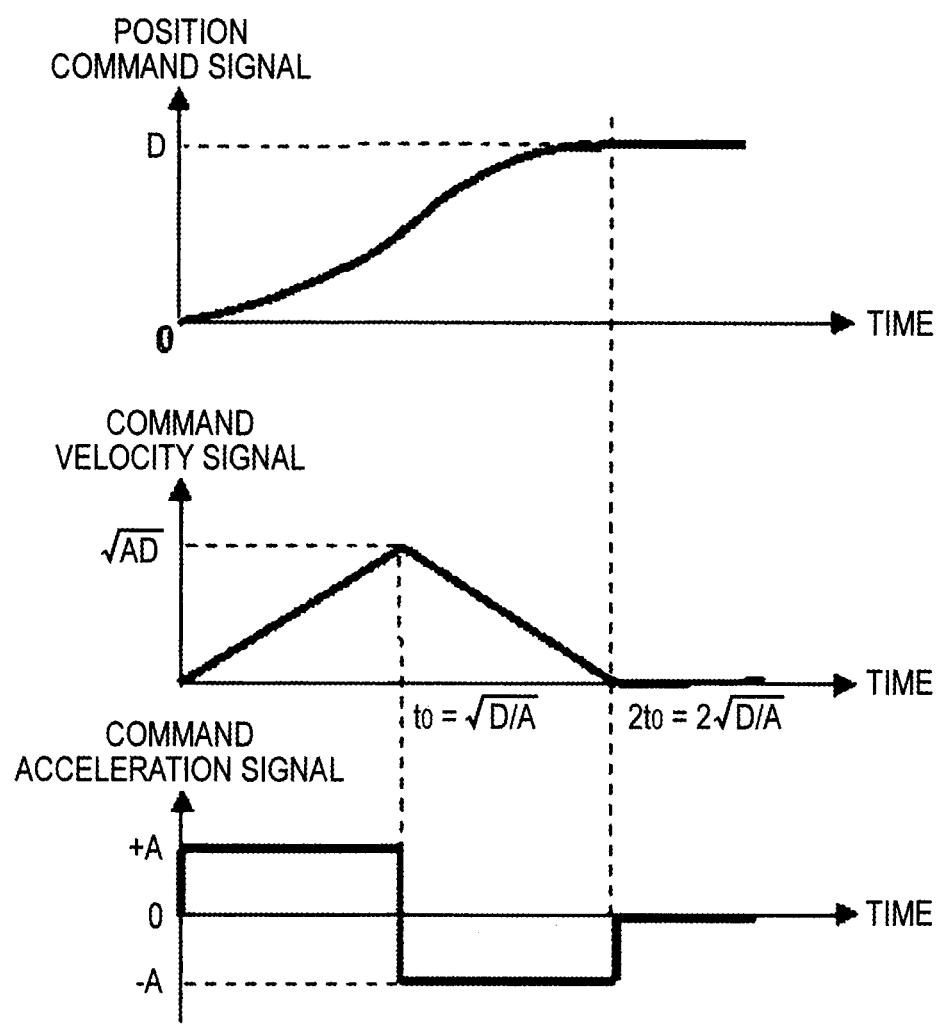
FIG. 3 is a view showing an example of a position command signal of the first servo controller in Embodiment 1 of the invention.

Here, the position command signal producing unit 30 produces the position command signal 40 so that the final value of the position command signal is the movement distance, and the maximum value of a command acceleration signal which is the second order differentiation of the position command signal is equal to or smaller than the limited acceleration. A specific example of such a position command signal is a signal in which a command velocity signal that is a differential signal of the position command signal has a triangular shape. Hereinafter, a command in which a command velocity signal that is the differential signal of the position command signal has a triangular shape is referred to as a triangular command. FIG. 3 shows the position command signal of a triangular command, the command velocity signal which is the first order differentiation of the position command signal, and the command acceleration signal which is the second order differentiation of the position command signal. D denotes the movement distance, and A denotes the acceleration. As shown in FIG. 3, the position command signal of a triangular command linearly accelerates at acceleration A during acceleration (from time 0 to time $\sqrt{(D/A)}$), and linearly decelerates at acceleration −A during deceleration (from time $\sqrt{(D/A)}$ to time $2\times\sqrt{(D/A)}$). Among position command signals that operate at acceleration in which the absolute value is equal to or smaller than A, in a triangular command, the time period from the start of the position command signal to reaching the target movement distance is shortest.

A specific example of the control in the position controller 31 is the P control in which a proportional element is multiplied to the position deviation signal 41 and the velocity command signal is output. A specific example of the velocity controller 33 is the PI control which is configured by a proportional element and an integral element.

Figure 4:
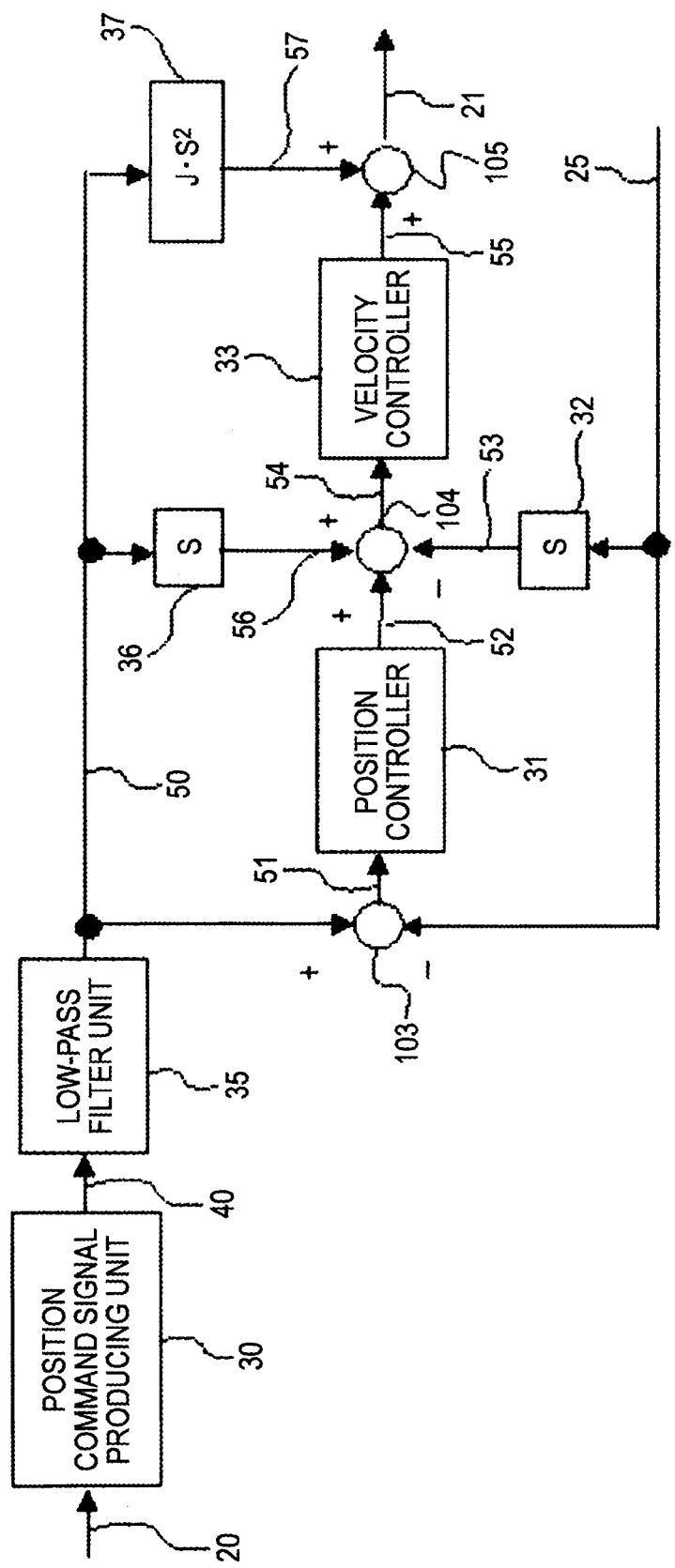
FIG. 4 is a block diagram showing another example of the first servo controller in Embodiment 1 of the invention.

FIG. 4 is a block diagram showing another example the first servo controller. The description of the components which are identical with those of the configuration shown in FIG. 2 is omitted. The reference numeral 35 is a low-pass filter unit in which the position command signal 40 is passed through a low-pass characteristic filter where the DC component is 1, to output a low-pass position command signal 50. A specific example of the low-pass characteristic filter is an application of a filter having a transfer characteristic of 1/(Ts+1) where s is the Laplace operator and T is the time constant of the filter. However, the filter is not limited to this. For example, a filter having a higher filter order may be used. The reference numeral 36 denotes a differentiator which differentiates the low-pass position command signal 50 to output a feedforward velocity command signal 56, and 37 denotes a feedforward torque command signal producing unit in which second order differentiation is performed on the low-pass position command signal 50, and then a gain element J that is determined by the total inertia of the machine is multiplied, thereby outputting a feedforward torque command signal 57. The reference numerals 103 to 105 denote adder/subtractors which perform addition/subtraction on the input signal.

The operation will be described. In the position command signal producing unit 30, the position command signal 40 is produced from the operation condition information 20. The position command signal 40 is supplied to the low-pass filter unit 35, and the low-pass position command signal 50 is produced. By using a position deviation signal 51 which is obtained by subtracting the detection position signal 25 from the low-pass position command signal 50, a velocity command signal 52 is calculated by the position controller 31. The velocity command signal 52 and the feedforward velocity command signal 56 which is obtained by differentiating the low-pass position command signal 50 are added together, and a detection velocity signal 53 which is obtained by differentiating the detection position signal 25 is subtracted from the sum to produce a velocity deviation signal 54. By using the velocity deviation signal 54, a provisional first torque command 55 is calculated by the velocity controller 33, and the provisional first torque command 55 and the feedforward torque command signal 57 which is produced from the low-pass position command signal 50 by the feedforward torque command signal producing unit 37 are added together, and then output as the first torque command 21.

As shown in FIGS. 2 and 4, the first servo controller 11 performs the positioning control without removing components of residual vibrations which are contained in the position command signal 40, and which are generated in the positioning control of the machine. Furthermore, the first servo controller 11 is not limited to the above-described configuration example, and may have any configuration as far as it performs the positioning control without considering suppression of residual vibrations of the machine.

The first servo controller 11 performs the positioning control without removing the components of residual vibrations which are contained in the position command signal, and which are generated in the positioning control of the machine. Therefore, a delay due to consideration of suppression of the residual vibrations of the machine is not generated, and the positioning time period required for the positioning control can be shortened. In the case where a triangular command in which the acceleration is set to the limited acceleration is used as the position command signal 40, particularly, the control is performed so as to follow the position command signal in which a movement of the shortest time period is attained, and hence the effect is particularly remarkable. By contrast, when the positioning control is performed on a machine of a low rigidity by using the first servo controller 11, the control is performed without considering suppression of residual vibrations of the machine, and hence it is usual that residual vibrations are easily generated during settling of the positioning control.

Next, the second servo controller 12 will be described in detail.

Figure 5:
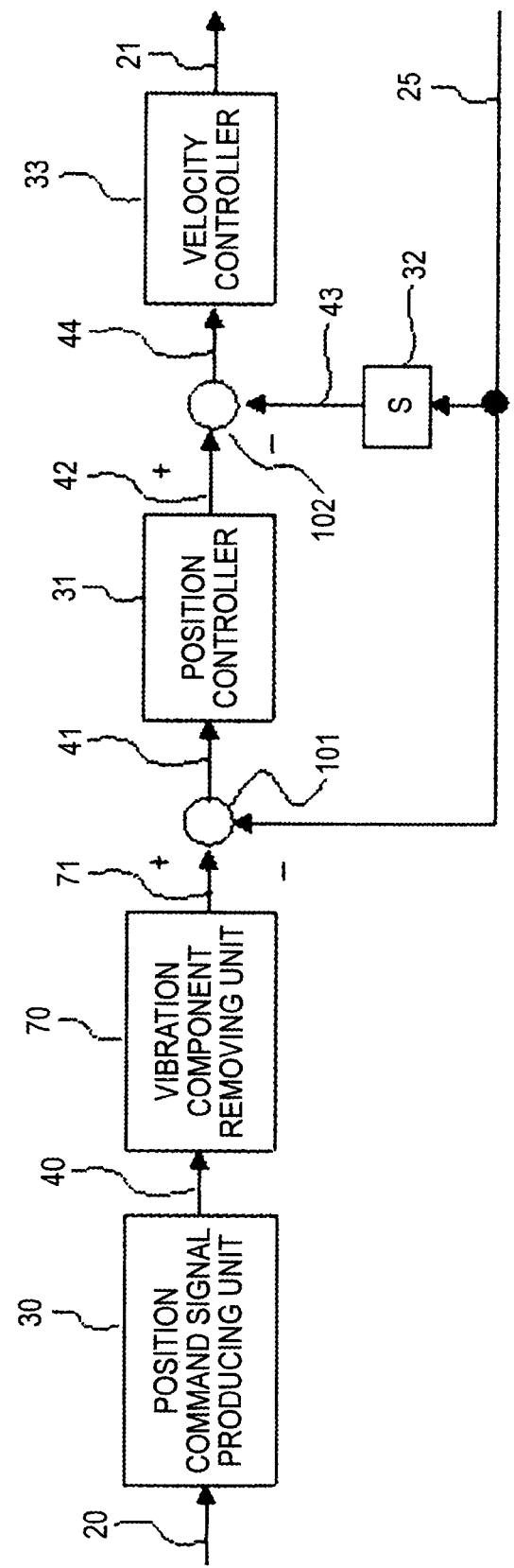
FIG. 5 is a block diagram showing an example of a second servo controller in Embodiment 1 of the invention.

FIG. 5 is a block diagram showing an example of the configuration of the second servo controller 12. The second servo controller 12 shown in FIG. 5 further includes a vibration component removing unit 70 in rear of the position command signal producing unit 30 in the configuration of the first servo controller 11 shown in FIG. 2. The vibration component removing unit 70 produces a vibration component removed position command signal 71 which is obtained by removing frequency components of residual vibrations from the position command signal 40. In the second servo controller 12 shown in FIG. 5, operations other than the vibration component removing unit 70 are identical with those of the first servo controller 11 shown in FIG. 2, and the positioning control is performed by using the vibration component removed position command signal 71 in place of the position command signal 40 in the first servo controller 11.

Figure 6:
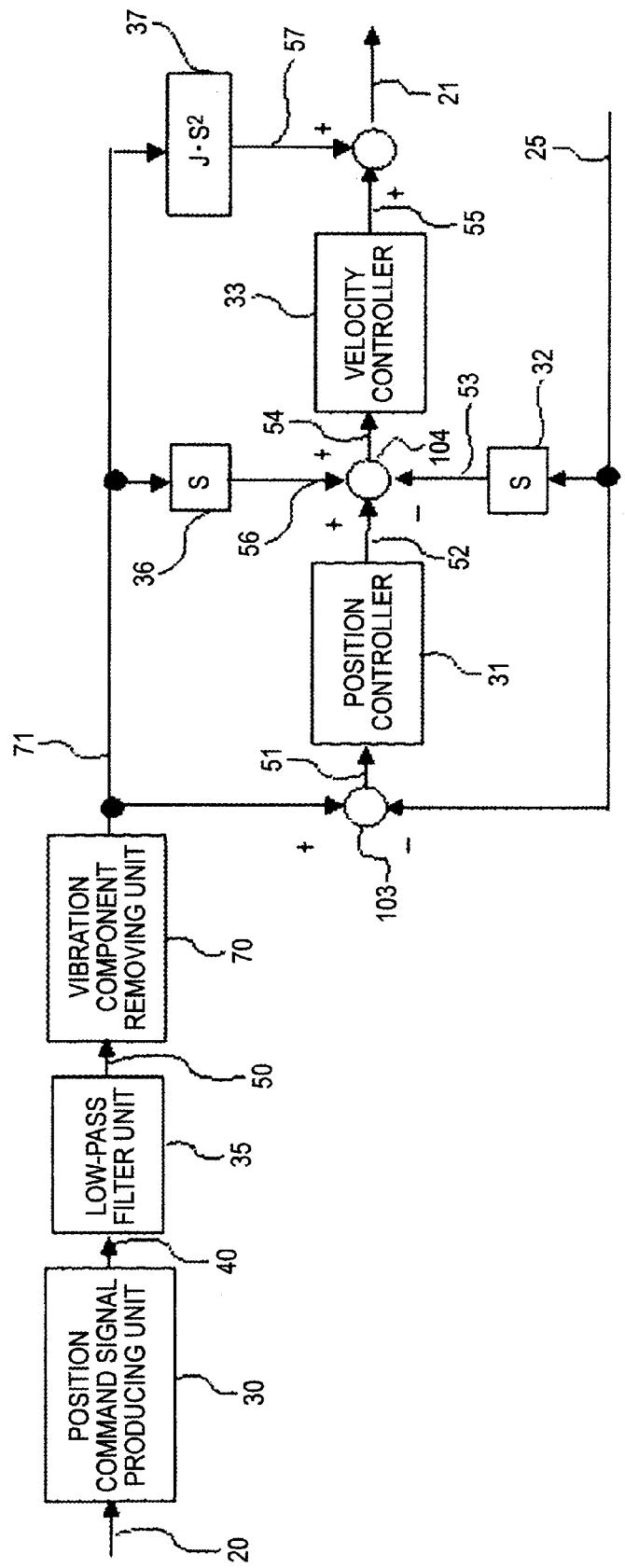
FIG. 6 is a block diagram showing another example of the second servo controller in Embodiment 1 of the invention.

FIG. 6 shows another configuration example of the second servo controller 12. The second servo controller 12 shown in FIG. 6 further includes the vibration component removing unit 70 in rear of the low-pass filter unit 35 in the configuration of the first servo controller 11 shown in FIG. 4. The vibration component removing unit 70 produces the vibration component removed position command signal 71 which is obtained by removing frequency components of residual vibrations from the low-pass position command signal 50. In the second servo controller 12 shown in FIG. 6, operations other than the vibration component removing unit 70 are identical with those of the first servo controller 11 shown in FIG. 4, and the positioning control is performed by using the vibration component removed position command signal 71 in place of the low-pass position command signal 50 in the first servo controller 11.

Here, the second servo controllers 12 shown in FIGS. 5 and 6 have the position command signal producing unit 30 which produces the position command signal 40 based on information of the movement distance and the limited acceleration that is the operation condition information 20. Alternatively, the position command signal 40 which is produced by the first servo controller 11 may be supplied to the second servo controller 12 to be used as the position command signal 40 in the second servo controller 12.

A specific example of the vibration component removing unit 70 may perform a filtering process by using a notch filter such as described below, thereby producing the vibration component removed position command signal 71.

[Exp. 1]

$$N(s) = \frac{1 + \exp(-sL)}{2} \quad (1)$$

where s is the Laplace operator, L is the time, and $\exp(-sL)$ means that the signal is delayed by the time L. The notch filter process of Expression (1) corresponds to an output of a signal which is obtained by adding the original position command signal and a position command signal that is delayed by the time L to each other, and then dividing the sum by 2. When this process is performed, a delay of time L/2 is generated with respect to the input signal, in the signal which is output from the vibration component removing unit 70. In order to suppress residual vibrations of the machine, L may be set to a half of the period $2\pi/\omega n$ of the residual vibrations, i.e., $L=2\pi/\omega n \times (1/2)$ may be set.

The vibration component removing unit 70 is not limited to that described above, and may have another form, for example, may use an IIR filter or the like. The vibration component removing unit 70 may be disposed so that, in place of the position command signal, the feedforward velocity command signal or the feedforward torque command signal is passed therethrough. More specifically, even when the vibration component removing unit 70 is configured so that, in place of the low-pass position command signal 50, the feedforward velocity command signal 56 or the feedforward torque command signal 57 is passed therethrough, similar effects are attained.

Figure 7:
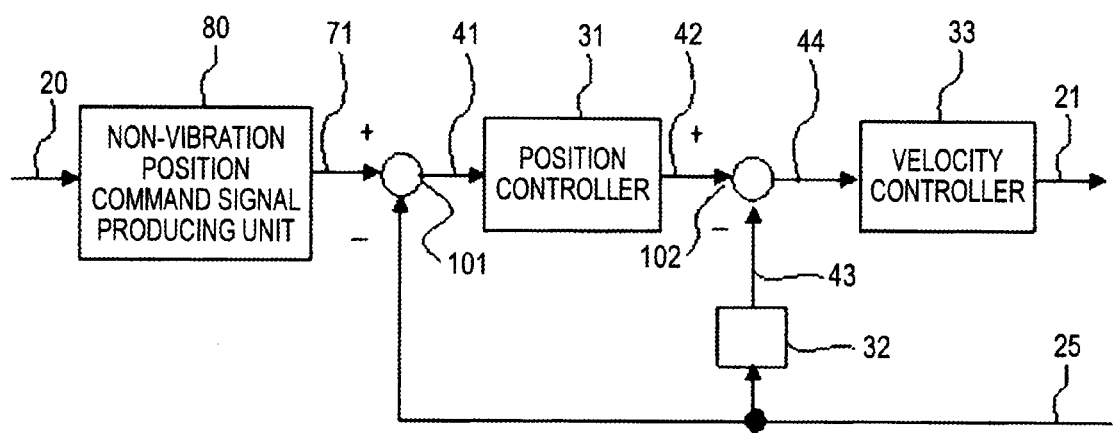
FIG. 7 is a block diagram showing another example of the second servo controller in Embodiment 1 of the invention.

FIG. 7 is an example showing a further configuration of the second servo controller 12. The configuration is different from the configuration of the second servo controller 12 shown in FIG. 5 in that the position command signal producing unit 30 and the vibration component removing unit 70 are not used and a non-vibration position command signal producing unit 80 is used. In the non-vibration position command signal producing unit 80, the operation condition information 20 is received, and the vibration component removed position command signal 71 is produced and output so that residual vibrations of a frequency $\omega n$ are not excited and the acceleration is equal to or smaller than the limited acceleration. In the second servo controller 12 shown in FIG. 7, the operation subsequent to the non-vibration position command signal producing unit 80 is identical with that of the first servo controller 11 shown in FIG. 5, and the positioning control is performed by using the vibration component removed position command signal 71.

A specific example of the position command signal which is produced by the non-vibration position command signal producing unit 80 will be shown. As disclosed by the present inventor in JP-A-2009-122777, a command velocity signal $V^*(t)$ which is the first order differentiation of the position command signal is expressed as $V^*(t)=v^*(t)+v^*(2t_0-t)$ by using a signal which is symmetric about an acceleration/deceleration time $t_0$, i.e., a function in which $v^*(t)=0$ when $t<0$ and $t>t_0$ (a command acceleration signal $A^*(t)$ which is the second order differentiation of the position command signal at this time is expressed as $A^*(t)=a^*(t)-a^*(2t_0-t)$ by using $a^*(t)=dv^*(t)/dt$, and $a^*(t)$ and a parameter contained in $a^*(t)$ are determined by using the frequency $\omega n$ of the residual vibrations in the following manner.

$$a*(t) = \begin{cases} ct & (0 \le t \le rt_0) \\ crt_0 & (rt_0 < t < (1-r)t_0) \\ -ct + ct_0 & ((1-r)t_0 \le t \le t_0) \\ 0 & (\text{otherwise}) \end{cases} \quad [\text{Exp. 2}]$$

$$r = 1 - \left[\frac{t_0\omega_n}{2\pi}\right] \times \frac{2\pi}{t_0\omega_n}$$

where c is a constant for causing the final value of the position command signal to become a movement distance D when the position command signal is obtained by performing second-order integration on the command acceleration signal $A^*(t)=a^*(t)-a^*(2t_0-t)$, and [Z] expresses the maximum integer which does not exceed Z. Then, a signal which is obtained by performing second-order integration on the command acceleration signal $A^*(t)$ expressed as described above is the position command signal.

In the case where the position command signal which is calculated in this manner is used, the following relationship expressing the acceleration/deceleration time $t_0$, the movement distance D, and the maximum value $A_p$ of the command acceleration signal:

$$A_p = \frac{1}{\left[\frac{t_0\omega_n}{2\pi}\right] \cdot \frac{2\pi}{\omega_n}} \cdot \frac{D}{t_0} \quad [\text{Exp. 3}]$$

is used, and $t_0$ is selected so that $A_p$ is equal to or smaller than the limited acceleration, whereby a position command signal which is equal to or smaller than the limited acceleration can be obtained while suppressing residual vibrations of the frequency $\omega n$.

Another specific example of the position command signal which is produced by the non-vibration position command signal producing unit 80 will be shown. When the command acceleration signal $A^*(t)$ which is the second order differentiation of the position command signal is expressed as a signal which is symmetric about the acceleration/deceleration time $t_0$, i.e., $A^*(t)=a^*(t)-a^*(2t_0-t)$ (when $t<0$ and $t>t_0$, $a^*(t)=0$), $a^*(t)$ and the parameter r contained in $a^*(t)$ are determined in the following manner:

$$a*(t) = c \times \cos\left(\frac{\pi}{2}\frac{r}{t_0}t\right) \quad [\text{Exp. 4}]$$

$$r = \pm 2\left(\frac{\omega_n t_0}{\pi} - 2m\right)$$

where c is the constant for causing the final value of the position command signal to become a movement distance D when the position command signal is obtained by performing second-order integration on the command acceleration signal $A^*(t)=a^*(t)-a^*(2t_0-t)$, and m is an integer which is equal to or larger than 1. Then, a signal which is obtained by performing second-order integration on the command acceleration signal $A^*(t)$ expressed as described above is the position command signal.

In the case where the position command signal which is calculated in this manner is used, the following relationship expressing the acceleration/deceleration time $t_0$, the movement distance D, and the maximum value of the command acceleration signal:

$$A_p = \frac{D}{t_0^2} \cdot \frac{4\left(\frac{\omega_n t_0}{\pi} - 2m\right)^2}{1 - \cos(\omega_n t_0)} \quad [\text{Exp. 5}]$$

is used, and $t_0$ is selected so that $A_p$ is equal to or smaller than the limited acceleration, whereby a position command signal which is equal to or smaller than the limited acceleration can be obtained while suppressing residual vibrations of the frequency $\omega n$.

In the case of the second servo controllers 12 shown in FIGS. 5 and 6, the component having the frequency which is equal to that of the residual vibrations of the machine is removed from command signals such as the position command signal 40 and the low-pass position command signal 50, and therefore the residual vibrations which are generated during settling of the positioning control can be suppressed. However, this corresponds to the case where the original position command signal is shaped so that vibrations are not excited, and hence a delay is generated with respect to the original position command signal. When the time period which is required for the motor to reach the target movement distance in the case where the position command signal 40 or the low-pass position command signal 50 is used as the command signal used in the positioning control is compared with that in the case where the vibration component removed position command signal 71 is used, the time period in the case where the vibration component removed position command signal 71 is used is longer than that in the case where the position command signal 40 or the low-pass position command signal 50 is used.

Also in the second servo controller 12 shown in FIG. 7, the vibration component removed position command signal 71 which does not excite vibrations is produced, and therefore the residual vibrations which are generated during settling of the positioning control can be suppressed. When a comparison is made under the same operation conditions (i.e., the same movement distance and the same limited acceleration), the time period from the start of the position command signal to reaching the target movement distance in the case where the vibration component removed position command signal 71 which does not excite vibrations is used in the positioning control is longer than that in the case where a triangular command in which the limited acceleration is maximally utilized is used in the positioning control.

As described above, in the second servo controller 12, the positioning control is performed with considering suppression of residual vibrations of the machine, and hence the residual vibrations which are generated during settling of the positioning control can be suppressed, but the positioning time period is prolonged.

Next, the residual vibration amplitude predicting unit 15 will be described.

Figure 8:
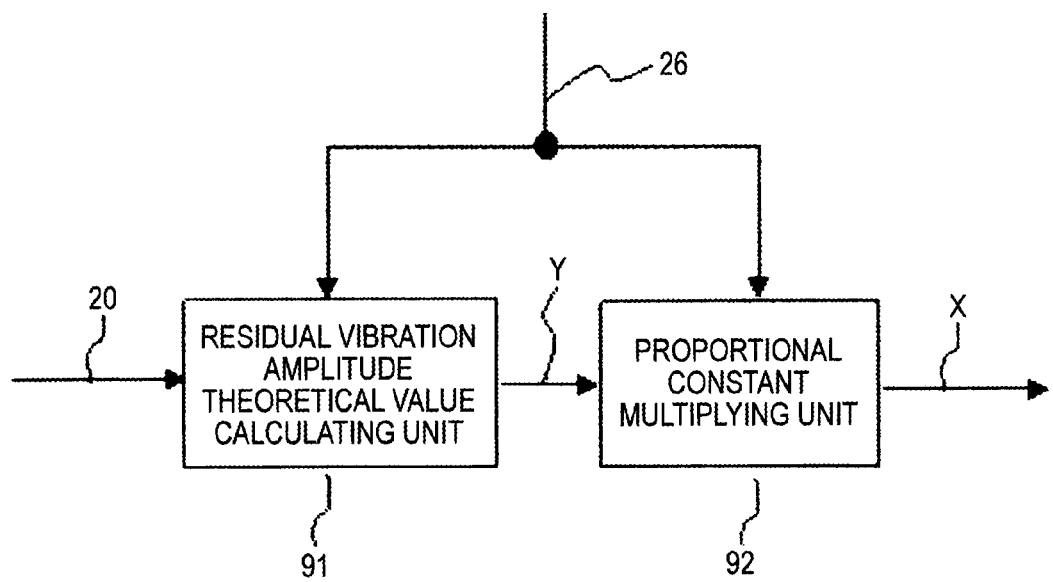
FIG. 8 is a block diagram showing an example of a residual vibration amplitude predicting unit in Embodiment 1 of the invention.

FIG. 8 is a block diagram showing an example of the configuration of the residual vibration amplitude predicting unit 15 in FIG. 1. In FIG. 8, 91 denotes a residual vibration amplitude theoretical value calculating unit which calculates a residual vibration amplitude theoretical value Y based on the operation condition information 20 and the residual vibration information 26, and 92 denotes a proportional constant multiplying unit which multiplies the residual vibration amplitude theoretical value Y with a proportional constant to calculate a residual vibration amplitude predictive value X.

In the residual vibration amplitude predicting unit 15, the operation condition information 20 and the residual vibration information 26 are supplied to the residual vibration amplitude theoretical value calculating unit 91, and the residual vibration amplitude theoretical value Y when the operation is performed by using the first servo controller 11 is calculated. The calculated residual vibration amplitude theoretical value Y and the residual vibration information 26 are supplied to the proportional constant multiplying unit 92. In the proportional constant multiplying unit 92, the proportional constant is multiplied with the residual vibration amplitude theoretical value Y to calculate the residual vibration amplitude predictive value X, and the calculated value is output.

Here, the proportional constant in the proportional constant multiplying unit 92 is determined in the following procedure.

First, the positioning control is actually performed by using the first servo controller 11 under certain operation conditions (the movement distance D0 and the acceleration A0 are set), and the amplitude (the displacement from the target position) X0 and frequency $\omega n$ of vibrations of the detection position signal 25 which is output at this time from the position detector 2 are separately measured by arbitrary means. The position command signal at this time is the target movement distance D0, and the maximum value of the command acceleration signal which is the second order differentiation of the position command signal is A0.

Next, in the residual vibration amplitude theoretical value calculating unit 91, a residual vibration amplitude theoretical value Y0 when the operation is performed by using the first servo controller 11 under the operation conditions (the movement distance D0 and the acceleration A0 are set) is calculated by:

[Exp. 6]

$$Y_0 = \hat{V}^*(\omega_n) \exp(j\omega_n t_0) \quad (2)$$

or

[Exp. 7]

$$Y_0 = 2\int_0^{t_0} \{\cos \omega_n (t_0 - \tau)\} v^*(\tau) d\tau \quad \text{[Exp. 7]}$$

where $t_0$ is a half (acceleration/deceleration time period) of the time period from the start of the position command signal to reaching the target movement distance, and j is an imaginary unit. $\hat{V}^*(\omega)$ is a Fourier transform showing frequency components of the command velocity signal which is the differential signal of the position command signal that is used in the positioning control in the case of the measurement of X0, and $\hat{V}^*(\omega n)$ indicates frequency components of the residual vibrations at the frequency $\omega = \omega n$. Furthermore, $v^*(t)$ indicates the command velocity signal from time 0 to time $t_0$.

In the case where the position command signal is a triangular command of the movement distance D0 and the acceleration A0, particularly, the residual vibration amplitude theoretical value Y0 can be calculated by:

[Exp. 8]

$$Y_0 = A_0 \left\{ 1 - \cos\left(\omega_n \sqrt{\frac{D_0}{A_0}}\right) \right\} \quad (3)$$

By using the values of these X0 and Y0, the proportional constant in the proportional constant multiplying unit 92 is set to X0/Y0. In the case where the operation conditions of the positioning control are a movement distance D1 and an acceleration A1, the residual vibration amplitude theoretical value calculating unit 91 performs the calculation while the variables are converted as D0→D1 and A0→A1 in the above-described procedure for obtaining Y0.

Next, the servo control selecting unit 16 will be described.

Figure 9:
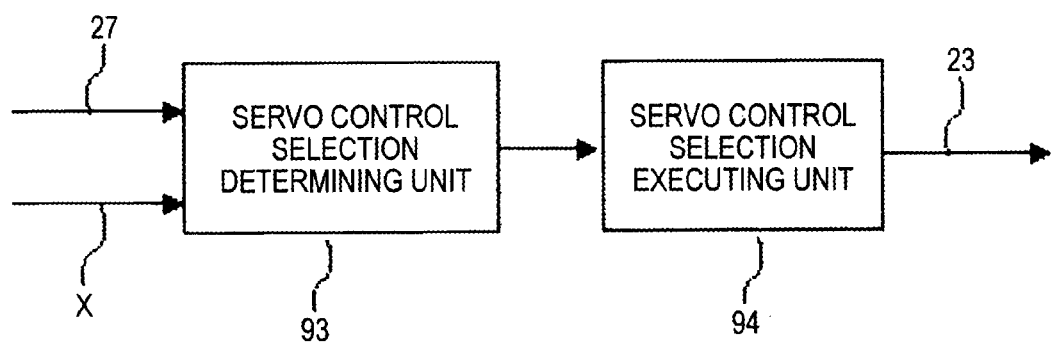
FIG. 9 is a block diagram showing an example of a motor control selecting unit in Embodiment 1 of the invention.

FIG. 9 is a block diagram showing an example of the configuration of the servo control selecting unit 16 in FIG. 1. In FIG. 9, 93 denotes a servo control selection determining unit which compares the allowable positioning error with the value of the residual vibration amplitude predictive value X to determine the degree, and which determines which one of the positioning controls of the first servo controller 11 and the second servo controller 12 is to be selected, and 94 denotes a servo control selection executing unit which, based on a result of the determination by the servo control selection determining unit 93, selects one of the first servo controller 11 and the second servo controller 12, and which causes the selected unit to perform the positioning control.

In the servo control selecting unit 16, into the servo control selection determining unit 93, the allowable positioning error 27 is input from the allowable positioning error inputting unit 13, and the residual vibration amplitude predictive value X is input from the residual vibration amplitude predicting unit 15. In the servo control selection determining unit 93, the values of the allowable positioning error 27 and the residual vibration amplitude predictive value X are compared with each other, and, when the residual vibration amplitude predictive value X is smaller than the allowable positioning error 27, the positioning control is performed by the first servo controller 11. When the residual vibration amplitude predictive value X is larger than the allowable positioning error 27, the positioning control is performed by the second servo controller 12.

Figure 10:
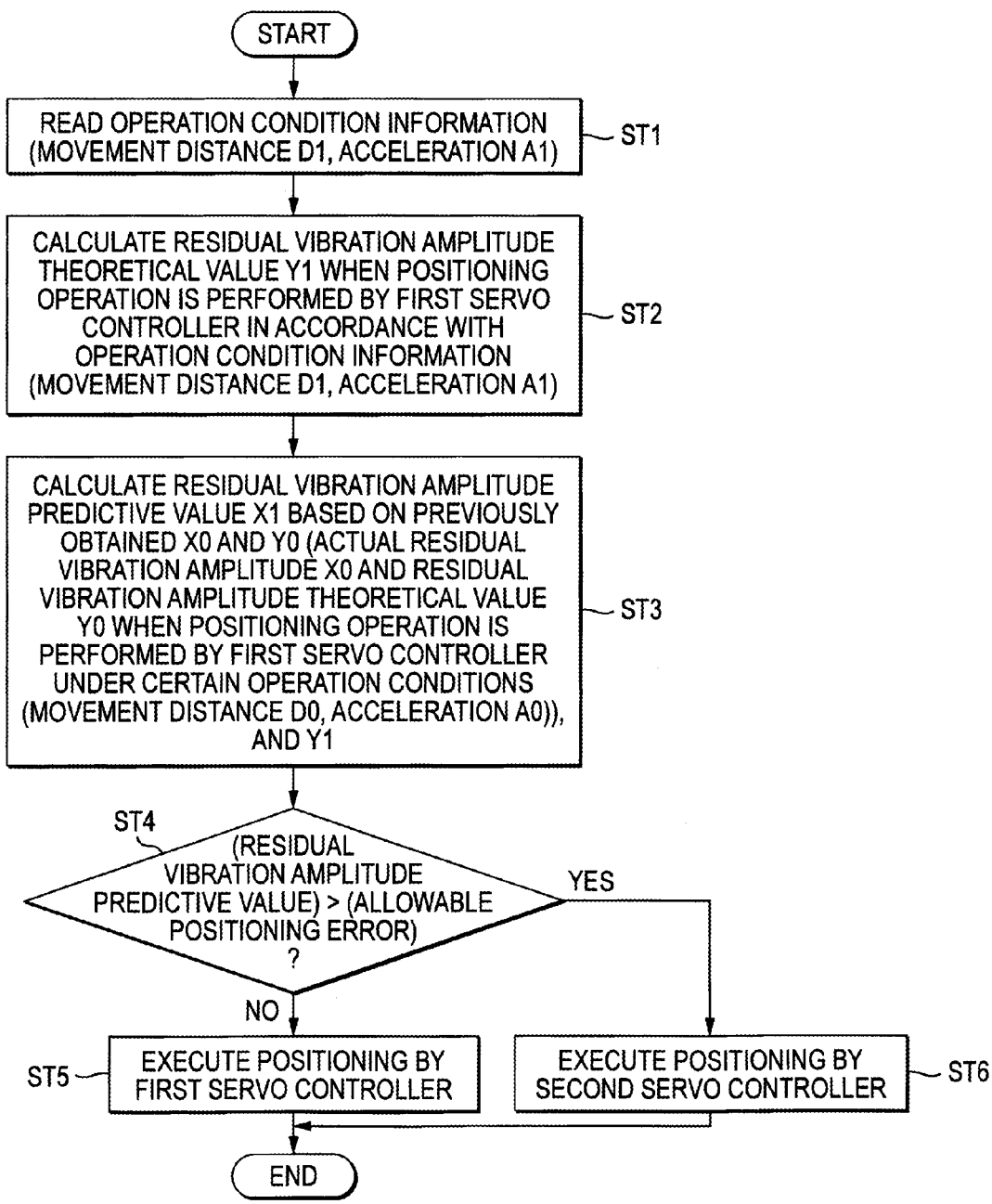
FIG. 10 is a flowchart showing a process of the positioning control device of Embodiment 1 of the invention.

FIG. 10 is a flowchart specifically illustrating processes of the residual vibration amplitude predicting unit 15 and the servo control selecting unit 16.

In step ST1, the operation condition information 20 of the movement distance D1 and the acceleration A1 which is information for performing the positioning control is read from the operation condition information unit 10 into the residual vibration amplitude predicting unit 15.

In step ST2, before the positioning control is actually performed, a residual vibration amplitude theoretical value Y1 which is produced when the operation is performed by using the first servo controller 11 under the above-described operation conditions is calculated in the residual vibration amplitude theoretical value calculating unit 91. Specifically, with respect to a position command signal which is the movement distance D1, and in which the maximum value of the command acceleration signal that is the second order differentiation of the position command signal is equal to or smaller than A1 the theoretical value is calculated by using Fourier transform $\hat{V}^*(\omega)$ showing frequency components of the command velocity signal which is the differential signal of the position command signal, by:

[Exp. 9]

$$Y_1 = \hat{V}^*(\omega_n)\exp(j\omega_n t_0) \quad (4)$$

or

[Exp. 10]

$$Y_1 = 2\int_0^{t_0}\{\cos \omega_n(t_0-\tau)\}v^*(\tau)d\tau \quad [\text{Exp. 10}]$$

In Expressions (2) and (4), Y0 and Y1 are calculated by using the frequency components $V^*\text{hat}(\omega n)$ of the command velocity signal. Alternatively, Y0 and Y1 may be calculated also by using the positioning control, the frequency components $A^*\text{hat}(\omega)$ of the command acceleration command signal $A^*(t)$ which is the second order differential signal of the position command signal, or the frequency components $J^*\text{hat}(\omega)$ of a command jerk command signal $J^*(t)$ which is the third order differential signal. $V^*(t)$ is the signal which is obtained by performing first-order differentiation on $X^*(t)$, that which is obtained by performing first-order integration on $A^*(t)$, and that which is obtained by performing second-order integration on $J^*(t)$. Therefore, Y1 may be calculated as:

$$Y_1 = j\omega_n \hat{X}^*(j\omega_n)\exp(j\omega_n t_0) \quad [\text{Exp. 11}]$$

$$Y_1 = \frac{\hat{A}^*(j\omega_n)}{j\omega_n}\exp(j\omega_n t_0)$$

$$Y_1 = -\frac{\hat{J}^*(j\omega_n)}{\omega_n^2}\exp(j\omega_n t_0)$$

In any case, Y1 is calculated in proportion to the frequency components at the frequency ωn of the residual vibrations of the position command signal, the command velocity signal, the command acceleration signal, and the command jerk signal.

In the case of a triangular signal in which the position command signal is the acceleration A, particularly, Y1 is calculated as:

[Exp. 12]

$$Y_1 = A\left\{1 - \cos\left(\omega_n\sqrt{\frac{D}{A}}\right)\right\} \quad (5)$$

In step ST3, based on the measurement value X0 of the residual vibration amplitude and the residual vibration amplitude theoretical value Y0 when the positioning operation is performed by the first servo controller 11 under the operation conditions (the movement distance D0, the acceleration A0), and the residual vibration amplitude theoretical value Y1 when the operation is performed under the operation conditions (the movement distance D1, the acceleration A1), a residual vibration amplitude predictive value X1 is calculated in the proportional constant multiplying unit 92 by:

[Exp. 13]

$$X_1 = \frac{X_0}{Y_0} \times Y_1 \quad (6)$$

Namely, while the proportional constant is set to X0/Y0, the residual vibration amplitude is predicted in proportion to the residual vibration amplitude theoretical value Y1.

In step ST4, the residual vibration amplitude predictive value X1 which is calculated in step ST3, and the allowable positioning error 27 are compared with each other. Here, the allowable positioning error is a value which is determined depending on the positioning specifications of the machine, and input from the allowable positioning error inputting unit 13. In the case where the positioning accuracy is to be further improved, for example, the allowable positioning error is set to be small, and, in the case where the accuracy is not required to be so high, the allowable positioning error is set to be large. If the residual vibration amplitude predictive value X is smaller than the allowable positioning error 27, the actual positioning control is performed in step ST5 by the first servo controller 11 that performs the positioning control in which suppression of residual vibrations of the machine is not considered. If it is determined in step ST4 that the residual vibration amplitude predictive value X is larger than the allowable positioning error 27, the actual positioning control is performed in step ST6 by the second servo controller 12 that performs the positioning control in which suppression of residual vibrations of the machine is considered.

In the case where the positioning control is performed in a sequence manner with respect to a plurality of operation conditions (the movement distance, the acceleration), the positioning control under certain operation conditions is performed in accordance with the flowchart of FIG. 10, and, after this is completed, an operation in which other operation conditions are read in accordance with ST1, and the process subsequent to the reading step ST2 is performed is repeated. In this case, the process can be performed while, during repeated operations, same values are used as X0 and Y0 in step ST3.

As described above, when the positioning control is executed by using the first servo controller 11 in which suppression of residual vibrations of the machine is not considered, residual vibrations are generated, but an unnecessary delay is hardly generated. By contrast, when the positioning control is executed by using the second servo controller 12 in which suppression of residual vibrations of the machine is considered, residual vibrations are not generated, but a delay is easily generated.

Before the positioning control is actually executed, therefore, the amplitude of residual vibrations of the machine when the first servo controller 11 in which suppression of residual vibrations of the machine is not considered is used is predicted in step ST3, and, when the amplitude predictive value is equal to or smaller than the allowable positioning error, the positioning control is executed by using the first servo controller 11, whereby the positioning control in which an unnecessary delay is not generated and also residual vibrations are suppressed to be equal to or smaller than the allowable positioning error can be realized. In the case where the position command signal is a triangular command and the acceleration is the limited acceleration, particularly, the time period from the start of the position command signal to the timing when the command reaches the target position is shortest, and also the positioning time period can be shortened.

If the residual vibration amplitude predictive value is larger than the allowable positioning error, the second servo controller 12 in which suppression of residual vibrations of the machine is considered is used in step ST6, whereby the positioning control operation to within the allowable positioning error which must be minimally satisfied in a positioning control can be realized.

As described above, the first servo controller 11 in which suppression of residual vibrations of the machine is not considered, and the second servo controller 12 in which suppression of residual vibrations of the machine is considered can be automatically selectively used in accordance with the operation conditions, thereby attaining effects that the positioning control operation to within the allowable positioning error can be realized, and that also the positioning time period can be shortened as far as possible.

Next, the grounds that the amplitude of the residual vibrations in the case where the first servo controller 11 is used can be predicted by Expression (6) will be described. When the positioning control is performed by using the first servo controller 11 in which suppression of residual vibrations of the machine is not considered, the settling characteristics are largely affected by the residual vibrations. At this time, the transfer characteristics from the position command signal X*(t) to the detection position signal X(t) can be approximated by:

[Exp. 14]

$$\hat{X}(s) = \frac{\omega_n^2}{s^2 + \omega_n^2} \hat{X}^*(s) \tag{7}$$

by using the frequency $\omega n$ of the residual vibrations, where s is the Laplace operator, X*hat(s) is the Laplace transform of the position command signal, and Xhat(s) is the Laplace transform of the detection position signal.

Furthermore, also between the Laplace transform Vhat(s) of the detection velocity signal V(t) which is the differentiation of the detection position signal, and the Laplace transform V*hat(s) of the command velocity signal V*(t) which is the differential signal of the position command, in the same manner as Expression (7), the relationship indicated by:

[Exp. 15]

$$\hat{V}(s) = \frac{\omega_n^2}{s^2 + \omega_n^2} \hat{V}^*(s) \tag{8}$$

is established. Here, it is assumed that the position command signal X*(t) is started at time $t_0$, and reaches the target movement distance at time $2t_0$, and the relationship that the command velocity signal is symmetric about time $t=t_0$, i.e., the relationship indicated by:

[Exp. 16]

$$V(t)=v^*(t)+v^*(2t_0-t) \tag{9}$$

is established. In the expression, v*(t) is a signal in which v*(t)=0 when t<0 and t>$t_0$. The above-described triangular command, and the position command signal which has been described in the specific example of the position command signal produced in the non-vibration position command signal producing unit 80 are expressed as Expression (9).

The time response of the detection velocity signal V(t) on or after time $t \geq 2t_0$ is obtained by taking the inverse Laplace transform of Expression (8), and substituting Expression (9), as:

[Exp. 17]

$$\begin{aligned} V(t) &= \omega_n \int_0^{2t_0} \sin\omega_n(t-\tau)\{v^*(\tau) + v^*(2t_0-\tau)\}d\tau \\ &= \omega_n \int_0^{t_0} \sin\omega_n(t-\tau)v^*(\tau)d\tau + \\ &\quad \omega_n \int_{t_0}^{2t_0} \sin\omega_n(t-\tau)v^*(2t_0-\tau)d\tau \\ &= \omega_n \int_0^{t_0} \sin\omega_n(t-\tau)v^*(\tau)d\tau + \\ &\quad \omega_n \int_0^{t_0} \sin\omega_n(t-2t_0+\tau)v^*(\tau)d\tau \\ &= 2\omega_n \sin\omega_n(t-t_0)\int_0^{t_0} \cos\omega_n(t_0-\tau)v^*(\tau)d\tau \end{aligned}$$

Furthermore, the detection position signal X(t) on or after time $t \geq 2t_0$ can be expressed by integrating the above expression, as:

[Exp. 18]

$$X(t)=[-2\int_0^{t_0}\{\cos \omega_n(t_0-\tau)\}v^*(\tau)d\tau] \cos \omega_n(t-t_0)+D \quad \text{[Exp. 18]}$$

In the above expression, the term in the square brackets [ ] does not depend on time t, and hence this means that vibrations having a frequency of $\omega n$, and an amplitude indicated by:

[Exp. 19]

$$2\int_0^{t_0}\{\cos \omega_n(t_0-\tau)\}v^*(\tau)d\tau \tag{10}$$

are generated in the detection position signal X(t).

On the other hand, when the frequency components V*hat (jω) of the command velocity signal of Expression (9) is calculated, the relationship of:

[Exp. 20]

$$\hat{V}^*(j\omega) = \int_0^\infty \exp(-j\omega\tau)\{v^*(\tau) + v^*(2t_0 - \tau)\}d\tau \quad (11)$$

$$= \int_0^{t_0} v^*(\tau)\cos\omega\tau d\tau + \int_{t_0}^{2t_0} v^*(2t_0 - \tau)\cos\omega\tau d\tau -$$

$$j\left\{\int_0^{t_0} v^*(\tau)\sin\omega\tau d\tau + \int_{t_0}^{2t_0} v^*(2t_0 - \tau)\sin\omega\tau d\tau\right\}$$

$$= \int_0^{t_0} v^*(\tau)\{\cos\omega\tau + \cos\omega(2t_0 - \tau)\}d\tau -$$

$$j\left\{\int_0^{t_0} v^*(\tau)\{\sin\omega t + \sin\omega(2t_0 - \tau)\}d\tau\right\}$$

$$= 2\cos\omega t_0 \int_0^{t_0} v^*(\tau)\cos\omega\tau d\tau -$$

$$2j\sin\omega t_0 \int_0^{t_0} v^*(\tau)\cos\omega\tau d\tau$$

$$= 2\exp(-j\omega t_0) \int_0^{t_0} v^*(\tau)\cos\omega\tau d\tau$$

is obtained. In Expression (11), variable transformation of integration, $\tau \to 2t_0 - \tau$ is used for the establishment of the third equality, and identities of trigonometric function of:

[Exp. 21]

cos ωt+cos ω(2t₀−t)=2 sin ωt₀ cos ω(t₀−t)

sin ωt+sin ω(2t₀−t)=2 cos ωt₀ cos ω(t₀−t)  [Exp. 21]

are used for the establishment of the fourth equality.

In Expression (11), the equality is established in the first and last expressions. Therefore, the following relationship can be indicated.

[Exp. 22]

$$\int_0^{t_0} v^*(\tau)\cos\omega\tau d\tau = \frac{\hat{V}^*(j\omega)}{2}\exp(j\omega t_0) \quad (12)$$

When $\omega = \omega n$ is substituted into Expression (12), Expression (10) indicating the amplitude of the detection position signal becomes:

[Exp. 23]

$$\hat{V}^*(j\omega_n)\exp(j\omega_n t_0) \quad (13)$$

and it is seen that the amplitude is determined in proportion to V*hat(jωn) which shows the frequency components of the command velocity signal. Therefore, it is seen that, when the frequency components of the command velocity signal are previously calculated and the components of a command frequency which is a frequency corresponding to the frequency of the residual vibrations is obtained, it is possible to predict the residual vibration amplitude of the machine in the positioning control.

Particularly, the case where the position command signal is a triangular command of acceleration A will be considered. Fourier transform V*hat(s) of the command velocity signal of a triangular command can be obtained by calculating the command acceleration signal which is the differential signal of the command velocity signal, and hence is as follows:

[Exp. 24]

$$\hat{V}^*(s) = \frac{1}{s}\left\{\int_0^{t_0} A\exp(-st)dt + \int_{t_0}^{2t_0}(-A)\exp(-st)dt\right\} \quad (14)$$

$$= \frac{A}{s^2}(1 - 2\exp(-t_0 s) + \exp(-2t_0 s))$$

By substituting s=jωn into Expression (14), the residual vibration amplitude is calculated from Expressions (13) and (14), and then

[Exp. 25]

$$\hat{V}^*(j\omega_n)\exp(j\omega_n t_0) = -\frac{A}{\omega_n^2}(\exp(j\omega_n t_0) - 2 + \exp(-j\omega_n t_0)) \quad (15)$$

$$= \frac{2A}{\omega_n^2}\left(1 - \frac{\exp(j\omega_n t_0) + \exp(-j\omega_n t_0)}{2}\right)$$

$$= \frac{2A}{\omega_n^2}(1 - \cos\omega_n t_0)$$

is obtained. When the facts that the residual vibrations in the case where the position command signal is a triangular command of acceleration A do not depend on the operation conditions (the movement distance D, the acceleration A), and that the acceleration/deceleration is time $t_0 = \sqrt{(D/A)}$ are used, therefore, it is said that the amplitude is generated in proportion to:

$$A\left\{1 - \cos\left(\omega_n\sqrt{\frac{D}{A}}\right)\right\} \quad [\text{Exp. 26}]$$

As described above, the residual vibration amplitude can be expected in theory in accordance with Expressions (13) and (15). However, actually, the prediction using Expressions (13) and (15) may sometimes involve an error due to friction, the gain value of the set servo controller, or the like. Even in such a case, in dynamics where residual vibrations are generated, however, Expression (7) which is determined by the residual vibration frequency con exerts a large influence, and hence it is considered that Expressions (13) and (15) derived from the expression indicate the tendency of the vibration amplitude. Namely, it is considered that, between an amplitude X0 of vibrations when the operation is actually performed under certain operation conditions (the movement distance D0, the acceleration A0), and an amplitude X1 of vibrations when the operation is performed under other operation conditions (the movement distance D1, the acceleration A1), there is a proportional relationship, i.e., X0:Y0=X1:Y1. Therefore, the amplitude X0 of vibrations when the operation is actually performed under certain operation conditions (the movement distance D0, the acceleration A0) is previously measured, and amplitude X1 of vibrations when the operation is performed under other operation conditions (the movement distance D1, the acceleration A1) can be predicted by:

$$X_1 = \frac{X_0}{Y_0} \times Y_1 \quad [\text{Exp. 27}]$$

Effects of the invention will be specifically described by using simulation results.

A case will be considered where positioning control is performed on a machine in which the frequency of residual vibrations is 10 Hz ($\omega n=2\pi\times 10$ [rad/s]), under operation conditions in which a plurality of movement distances of 1 mm (=0.001 m), 5 mm (=0.005 m), 10 mm (=0.010 m), and 20 mm (=0.020 m) and the limited acceleration A=3.0 m/s$^2$, and the allowable positioning error is 0.5 mm irrespective of the length of the movement distance. Here, the behaviors of the detection position signal are compared with other by simulation when the positioning control is performed under the operation conditions by a positioning control system in which suppression of the 10-Hz residual vibrations of the machine is not considered irrespective of the movement distance (this system is referred to as the system A), a positioning control system in which suppression of the 10-Hz residual vibrations of the machine is considered irrespective of the movement distance (this system is referred to as the system B), and the positioning control system according to the invention (this system is referred to as the system C). Here, as the positioning control system of the system A, a servo controller which is configured in the same manner as the first servo controller 11 shown in FIG. 4 was used. As the positioning control system of the system B, a servo controller which is configured in the same manner as the second servo controller 12 shown in FIG. 6 was used, and the notch filter of Expression (1) was used in the vibration component removing unit. As the first servo controller 11 in the system C, the configuration shown in FIG. 4 was used, and, as the second servo controller 12, the configuration shown in FIG. 6 was used. In all the systems A, B, and C, a triangular command in which the limited acceleration is maximally utilized was used in the position command signal.

Figure 11:
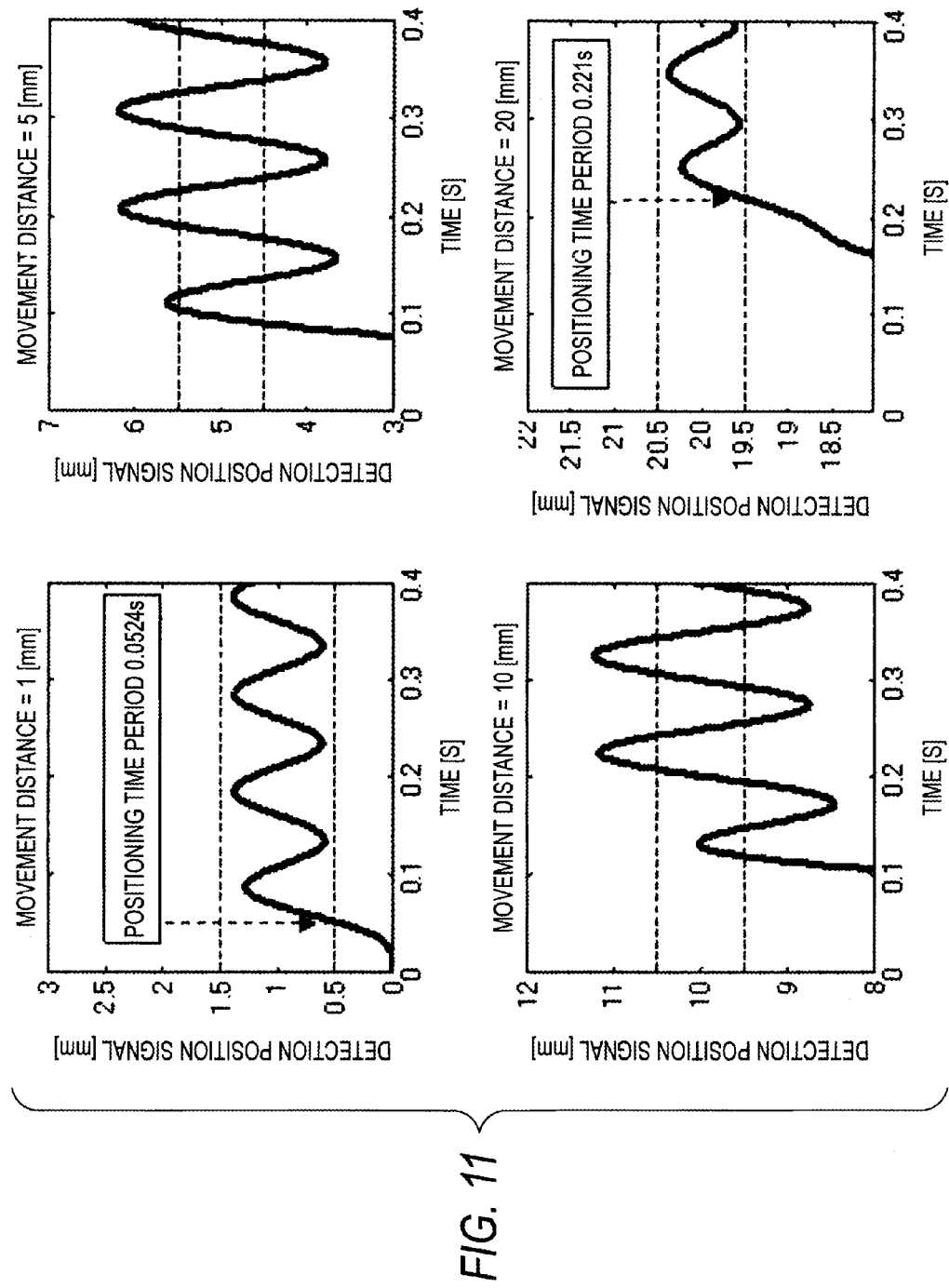
FIG. 11 is a view showing numerical simulation waveforms of mechanical vibrations when positioning control in Embodiment 1 of the invention in which residual vibrations are not removed away is performed.
Figure 12:
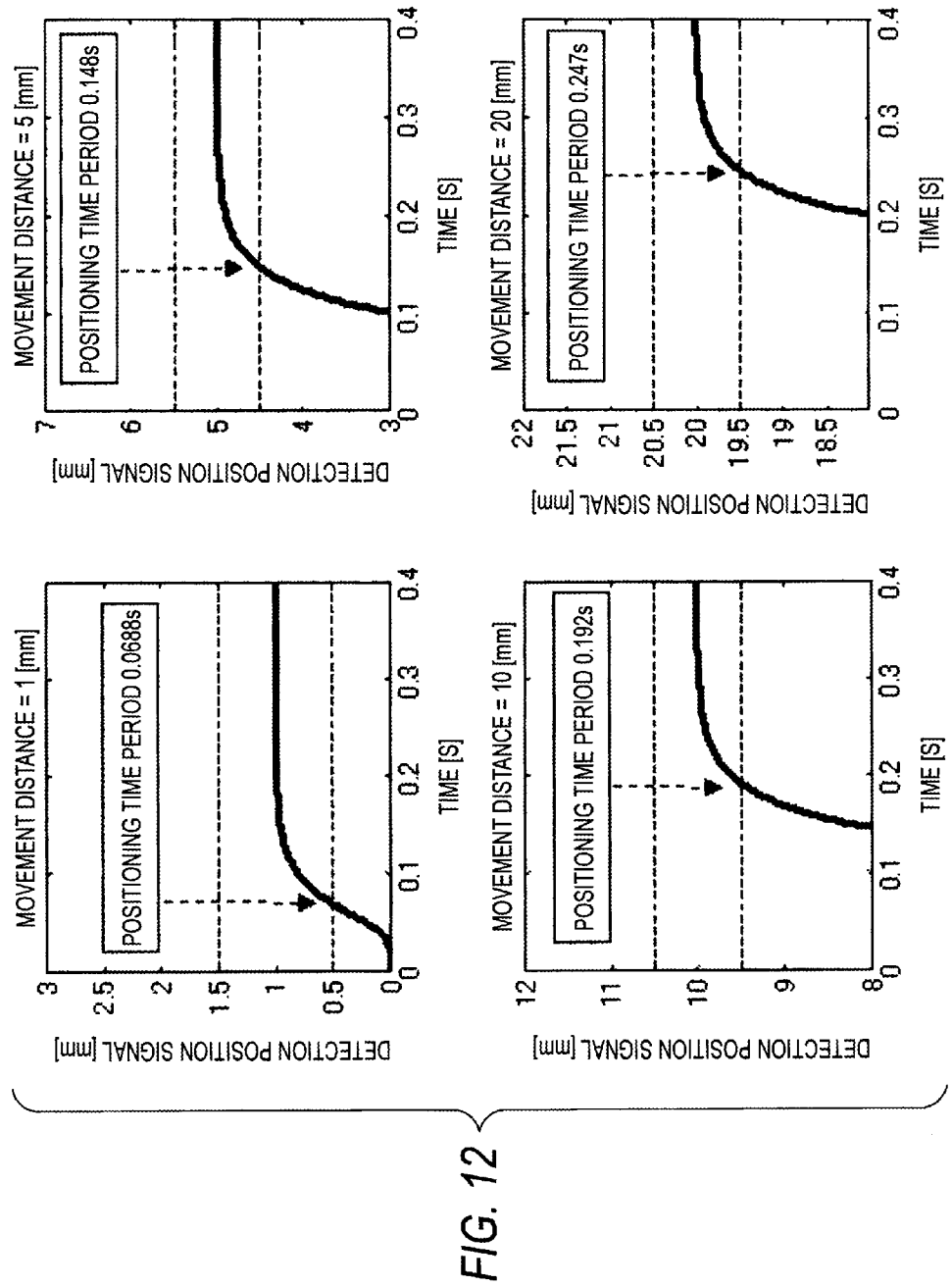
FIG. 12 is a view showing numerical simulation waveforms of mechanical vibrations when positioning control in Embodiment 1 of the invention in which residual vibrations are removed away is performed.
Figure 13:
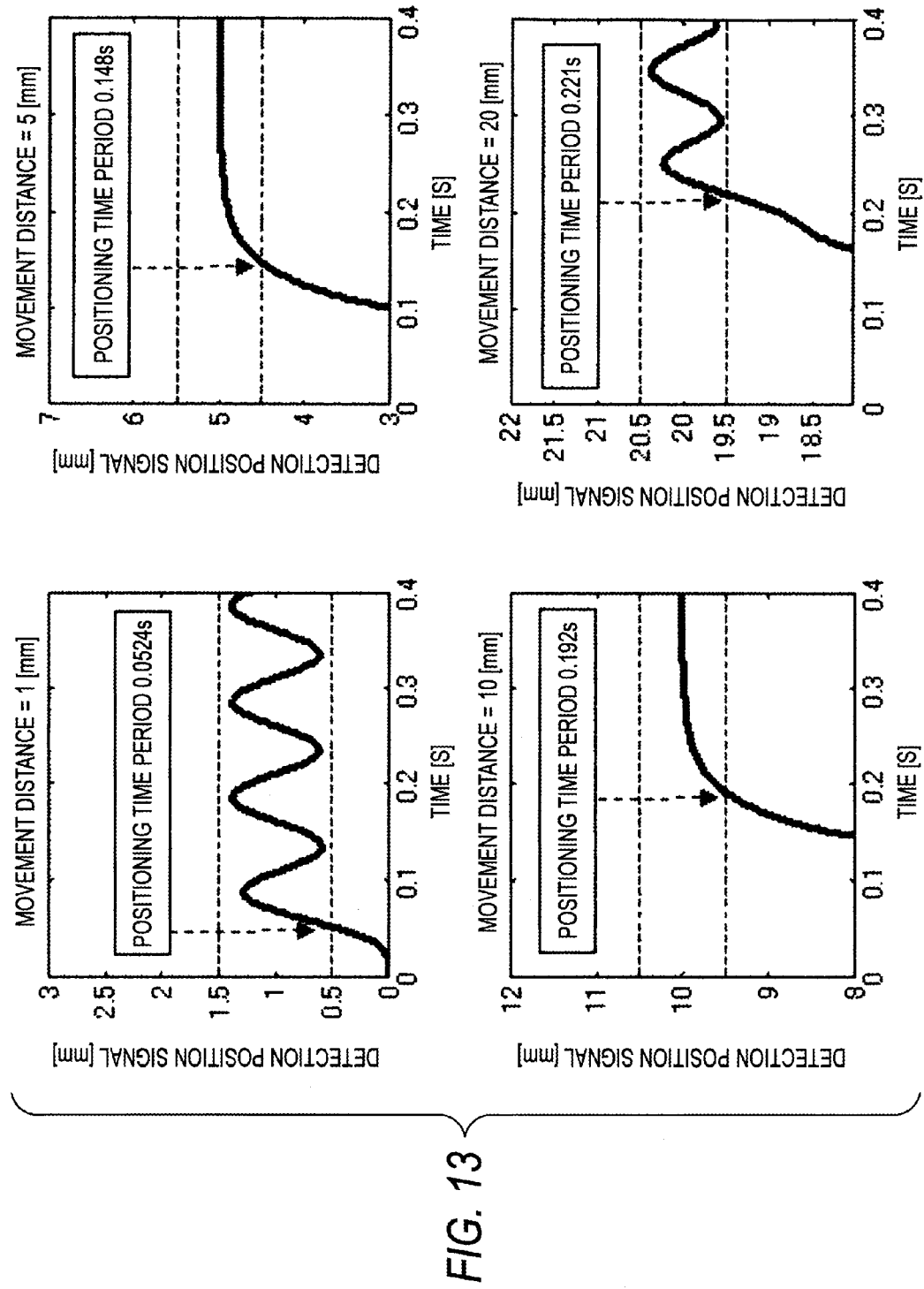
FIG. 13 is a view showing numerical simulation waveforms of mechanical vibrations when positioning control in Embodiment 1 of the invention is performed.

FIGS. 11 to 13 show waveforms indicating time response simulations of the time and the detection position signal in the case where the positioning control was performed by the above-described three systems. The time when the position command signal is started is set to 0 [s]. FIG. 11 shows the case of the system A, FIG. 12 shows that of the system B, and FIG. 13 shows that of the system C. In all of FIGS. 11, 12, and 13, the upper left portion indicates simulation results in the case of the movement distance of 1 mm, the upper right portion indicates those in the case of the movement distance of 5 mm, the lower left portion indicates those in the case of the movement distance of 10 mm, and the lower right portion indicates those in the case of the movement distance of 20 mm. In these figures, the solid lines indicate the detection position signal, and the broken lines indicate lines of the target movement distance±the allowable positioning error. When the detection position signal is between the broken lines after execution of the positioning control, the positioning control is adequate, and, when the amplitude of the vibrations appears outside the broken lines, the operation is inadequate as the positioning control.

As shown in FIG. 11, in the system A (the positioning control system in which suppression of the residual vibrations of the machine is not considered), it is seen that, at any movement distance, residual vibrations are generated during settling of the positioning control. In the case of the movement distances of 1 mm and 20 mm, however, even when residual vibrations are generated, the amplitude falls within the allowable positioning error. At this time, the positioning time period from start of the position command signal to converging of the detection position signal within the allowable positioning error is 0.0524 [s] in the case where the movement distance is 1 mm, and 0.221 [s] in the case where the movement distance is 20 mm. By contrast, in the case of the movement distances of 5 mm and 10 mm, residual vibrations which exceed the allowable positioning error are generated, and the operation is inadequate as the positioning control.

As shown in FIG. 12, in the system B (the positioning control system in which suppression of the residual vibrations of the machine is considered), irrespective of the movement distance, residual vibrations are not generated during settling of the positioning control, and, at any movement distance, the operation is adequate as the positioning control. The positioning time period is 0.0688 [s] in the case where the distance is 1 mm, 0.148 [s] in the case where the distance is 5 mm, 0.192 [s] in the case where the distance is 10 mm, and 0.247 [s] in the case where the distance is 20 mm.

Next, the case where the positioning control according to the system C in the embodiment of the invention is performed will be considered. The certain operation conditions which were used in obtaining of the amplitude X0 of residual vibrations when the positioning operation was actually performed by the first servo controller 11 were set to D0=1 mm and A0=3.0 m/s$^2$. When the movement distance is 1 mm in the system A, an amplitude of X0=0.39 mm is generated in the simulation, and also the systems A and C use a triangular command as the position command signal. When Y0 is calculated by Expression (3), therefore, Y0=1.767. Based on X0 and Y0, furthermore, the residual vibration amplitude predictive value X1 of another movement distance is calculated.

With respect to the movement distance of 1 mm, Y1=1.767 is obtained from Expression (5), and therefore the residual vibration amplitude predictive value is X1=0.39 mm from Expression (6). This is equal to or smaller than the allowable positioning error of 0.5 mm, and therefore the positioning control is performed by using the first servo controller 11 in which suppression of the 10-Hz residual vibrations of the machine is not considered.

With respect to the movement distance of 5 mm, Y1=5.515 is obtained from Expression (5), and therefore the residual vibration amplitude predictive value is X1=1.217 mm from Expression (6). This exceeds the allowable positioning error of 0.5 mm, and therefore the positioning control is performed by using the second servo controller 12 in which suppression of the 10-Hz residual vibrations of the machine is considered.

With respect to the movement distance of 10 mm, Y1=5.653 is obtained from Expression (5), and therefore the residual vibration amplitude predictive value is X1=1.248 mm from Expression (6). This exceeds the allowable positioning error of 0.5 mm, and therefore the positioning control is performed by using the second servo controller 12 in which suppression of the 10-Hz residual vibrations of the machine is considered.

With respect to the movement distance of 20 mm, Y1=1.783 is obtained from Expression (5), and therefore the residual vibration amplitude predictive value is X1=0.393 mm from Expression (6). This is equal to or smaller than the allowable positioning error of 0.5 mm, and therefore the positioning control is performed by using the first servo controller 11 in which suppression of the 10-Hz residual vibrations of the machine is not considered.

As shown in FIG. 13, in the system according to the invention (the system C), with respect to all the movement distances of 1 mm, 5 mm, 10 mm, and 20 mm, it is confirmed that the positioning control can be performed within the allowable positioning error, and the operation is adequate as the positioning control.

Table 1 summarizes the positioning time periods shown FIGS. 11, 12, and 13 obtained by simulation in the control systems.

TABLE 1

Positioning time period in each control system (unit is second)

| Movement distance | System A | System B | System C (Present Invention) |
|---|---|---|---|
| 1 mm | 0.0524 | 0.0688 | 0.0524 |
| 5 mm | NG | 0.148 | 0.148 |
| 10 mm | NG | 0.192 | 0.192 |
| 20 mm | 0.221 | 0.247 | 0.221 |

From Table 1, with respect to the distances of 1 mm and 20 mm, it is confirmed that the positioning time period in the system C is identical with that in the system A, and shorter than that of the system B. The reason of this is that, in the system C, the positioning control is performed by using the first servo controller 11. With respect to the distances of 5 mm and 10 mm, the positioning time period in the system C is identical with that in the system B. This is because, in the system C, the positioning control is performed by using the second servo controller 12.

As described above, it is confirmed that, in the specification of the system C that the positioning control is performed within the allowable positioning error in accordance with the operation conditions, the control system in which the time period required for the positioning control is shorter can be selected. In the above-described simulation, the allowable positioning error, the limited acceleration, and the like are constant irrespective of the movement distance. The invention can be applied also to the case where these are changed in accordance with the movement distance.

In accordance with the operation condition information (the movement distance and the acceleration), the amplitude of residual vibrations of the machine when the first servo controller 11 in which the positioning time period of the positioning control can be easily shortened is used is predicted, and the predictive value of the residual vibration amplitude and the allowable positioning error are compared with each other. In accordance with a result of the comparison, a control system in which the detection position signal converges within the allowable positioning error, and which is more advantageous to shorten the positioning time period is selected. Therefore, the positioning time period can be further shortened while suppressing vibrations within a desired positioning error.

Moreover, a control system in which, as described above, the detection position signal converges within the allowable positioning error irrespective of the movement distance, and which is advantageous to shorten the positioning time period can be selected. Therefore, an adjusting time period of the positioning control device itself can be shortened.

Furthermore, the control system is not switched over during the positioning control under certain conditions, and hence there is an effect that shock or vibrations due to the switching are not generated in the positioning control.

INDUSTRIAL APPLICABILITY

As described above, the invention is suitable for a positioning control device for driving a machine, and particularly most suitable for a positioning control device for driving a low-rigidity machine.

The invention claimed is:

1. A positioning control device characterized in comprising:

a first servo controller which, based on operation condition information configured of a limited acceleration of the machine and a movement distance of a machine in positioning control, produces a position command signal so that a final value is the movement distance and a command acceleration signal that is a second order differential signal is equal to or smaller than the limited acceleration, and which, based on a detection position signal that is detected position information of the machine and the position command signal, produces a first torque command signal for executing the positioning control so that the position command signal and a machine position coincide with each other;

a second servo controller which, based on the operation condition information configured of the limited acceleration of the machine and the movement distance of the machine in positioning control, produces a position command signal so that a final value is the movement distance and the command acceleration signal that is a second order differential signal is equal to or smaller than the limited acceleration, which, based on the operation condition information, produces a vibration component removed position command signal in which components of residual vibrations that are generated in the positioning control of the machine are removed away from the position command signal, and which, based on the detection position signal and the vibration component removed position command signal, produces a second torque command signal for executing the positioning control so that the vibration component removed position command signal and the machine position coincide with each other;

a residual vibration information inputting unit which stores residual vibration information that is obtained by measuring residual vibrations of the machine that are generated when the positioning control is previously performed by using the first servo controller under arbitrary operation conditions;

a residual vibration amplitude predicting unit which, based on the residual vibration information and the operation condition information, predicts an amplitude of residual vibrations of the machine that are generated when the positioning control is executed by using the first servo controller;

an allowable positioning error inputting unit which stores an allowable value of a difference between the movement distance of the machine that is a target of the positioning control and a detected position of the machine at a timing when the positioning control is ended as an allowable positioning error;

a servo controller selecting unit which selects a servo controller to be used in the positioning control for each operation conditions so that, in a case where the residual vibration amplitude predictive value predicted by the residual vibration amplitude predicting unit exceeds the allowable positioning error, the positioning control on the machine is executed by using the second servo controller, and, in a case where the residual vibration amplitude predictive value is equal to or smaller than the allowable positioning error, the positioning control on the machine is executed by using the first servo controller; and a current controller which controls a current to be supplied to a motor that drives the machine based on the torque command signal output from the servo controller that is selected by the servo controlling selecting unit.

2. A positioning control device according to claim 1, characterized in that, in place of producing the position command signal, based on the operation condition information consisting of the movement distance of the machine in positioning control and the limited acceleration of the machine, so that the final value is the movement distance and the command acceleration signal that is a second order differential signal is equal to or smaller than the limited acceleration, the second servo controller receives the position command signal produced by the first servo controller, and uses the position command signal in a calculation for producing the second torque command signal in the second servo controller.

3. A positioning control device according to claim 1, characterized in that, the residual vibration amplitude predicting unit predicts the amplitude of residual vibrations of the machine in proportion to frequency components corresponding to the frequency of the residual vibrations of the machine of the position command signal in the first servo controller, which is calculated based on the residual vibration information and the operation condition information, a command velocity signal which is a first order differentiation of the position command signal in the first servo controller, or a higher-order differential signal of the position command signal in the first servo controller.

4. A positioning control device according to claim 1, characterized in that, in a case where the frequency of the residual vibrations of the machine is $\omega_n$, the position command signal in the first servo controller is started at time 0, and reaches a target movement distance at time $2t_0$, and a shape of a command velocity signal $v^*(t)$, which is a differential signal of the position command signal in the first servo controller, is symmetric about time $t_0$, the residual vibration amplitude predicting unit predicts an amplitude of the residual vibrations of the machine in proportion to:

[Exp. 1]

$$\int_0^{t_0} \{\cos \omega_n(t_0-\tau)\} v^*(\tau) d\tau \quad \text{[Exp. 1]}.$$

5. A positioning control device according to claim 1, characterized in that, in a case where a command velocity signal which is a first order differentiation of the position command signal in the first servo controller has a triangular shape, the movement distance of the machine is D, a level of a command acceleration signal which is a second order differentiation of the position command signal in the first servo controller is A and the frequency of the residual vibrations of the machine is $\omega_n$, the residual vibration amplitude predicting unit predicts an amplitude of the residual vibrations of the machine in proportion to:

[Exp. 2]

$$A\left\{1 - \cos\left(\omega_n \sqrt{\frac{D}{A}}\right)\right\}.$$

6. A positioning control device according to claim 1, characterized in that, based on an amplitude of residual vibrations of the machine which are generated when the positioning control is performed under arbitrary operation conditions by using the first servo controller, the amplitude being previously measured, the residual vibration amplitude predicting unit predicts an amplitude of residual vibrations of the machine which is operated under another operation condition.

7. A positioning control device characterized in comprising:

a first servo controller which, based on operation condition information configured of a limited acceleration of the machine and a movement distance of a machine in positioning control, produces a position command signal so that a final value is the movement distance and a command acceleration signal that is a second order differential signal is equal to or smaller than the limited acceleration, and which, based on a detection position signal that is detected position information of the machine and the position command signal, produces a first torque command signal for executing the positioning control so that the position command signal and a machine position coincide with each other;

a second servo controller which, based on the operation condition information configured of the limited acceleration of the machine and the movement distance of the machine in positioning control, produces a position command signal so that a final value is the movement distance and the command acceleration signal that is a second order differential signal is equal to or smaller than the limited acceleration, which produces a signal in which components of the residual vibrations that are generated in the positioning control of the machine are removed from a feedforward velocity command signal that is obtained by performing a first order differentiation on a signal that is obtained by passing the position command signal through a low-pass characteristic filter or from a feedforward torque command signal that is obtained by performing a second order differentiation on a signal that is obtained by passing the position command signal through a low-pass characteristic filter and by multiplying thereto a resulting signal by a gain element that is determined by a total inertia of the machine, and which, based on the signal in which the components of the residual vibrations are removed and the detection position signal, produces a second torque command signal for executing the positioning control;

a residual vibration information inputting unit which stores residual vibration information that is obtained by measuring residual vibrations of the machine that are generated when the positioning control is previously performed by using the first servo controller under arbitrary operation conditions;

a residual vibration amplitude predicting unit which, based on the residual vibration information and the operation condition information, predicts an amplitude of residual vibrations of the machine that are generated when the positioning control is executed by using the first servo controller;

an allowable positioning error inputting unit which stores an allowable value of a difference between the movement distance of the machine that is a target of the positioning control, and a detected position of the machine at a timing when the positioning control is ended as an allowable positioning error;

a servo controller selecting unit which selects a servo controller to be used in the positioning control for each operation conditions so that, in a case where the residual vibration amplitude predictive value predicted by the residual vibration amplitude predicting unit exceeds the allowable positioning error, the positioning control on the machine is executed by using the second servo controller, and, in a case where the residual vibration amplitude predictive value is equal to or smaller than the allowable positioning error, the positioning control on the machine is executed by using the first servo controller; and a current controller which controls a current to be supplied a motor that drives the machine, based on the torque command signal output from the servo controller that is selected by the servo controlling selecting unit.

* * * * *